Oct. 16, 1934. A. A. SCHAAF 1,977,492
BAG OR CASING CLOSER AND HANGER
Filed Oct. 16, 1933
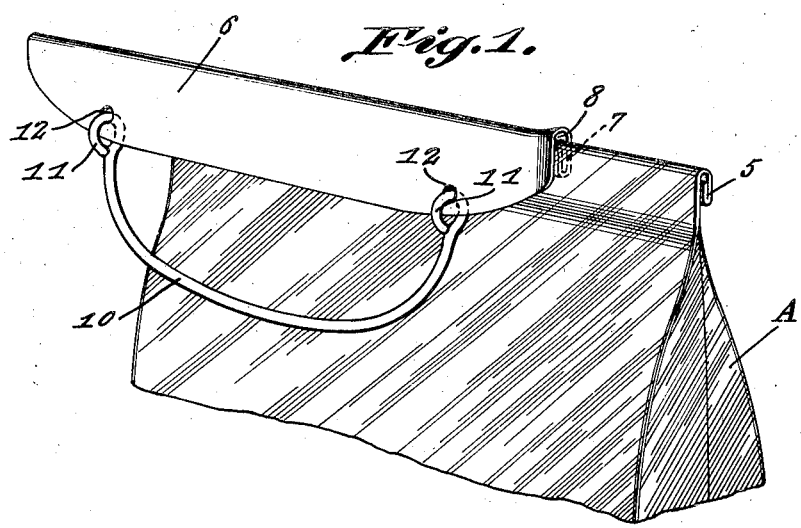
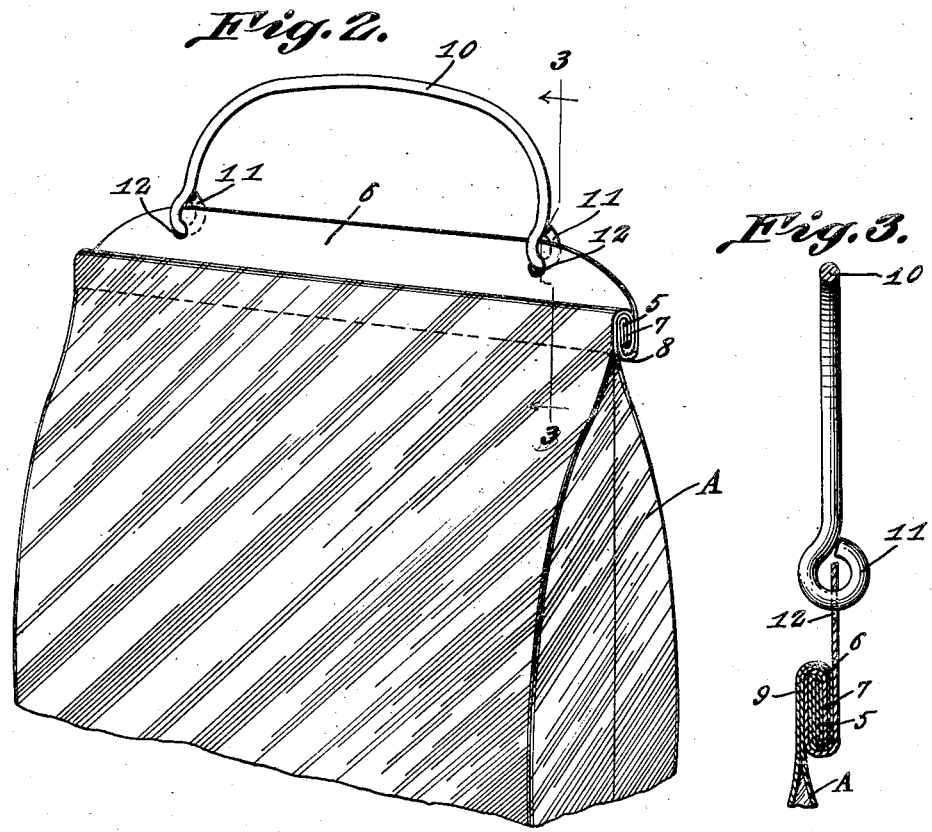
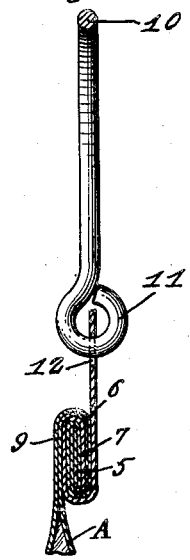
Arthur A. Schaaf, INVENTOR
BY Victor J. Evans & Co.
ATTORNEY Patented Oct. 16, 1934

1,977,492

UNITED STATES PATENT OFFICE

1,977,492

BAG OR CASING CLOSER AND HANGER

Arthur A. Schaaf, Lima, Ohio

Application October 16, 1933, Serial No. 693,866

1 Claim. (Cl. 229—54)

The invention relates to a bag or casing closer and hanger and more especially to that kind for use with "Cellophane" type casings for meats, such as sausage or the like.

The primary object of the invention is the provision of a device of this character, wherein the mouth end of a bag or casing usually made from "Cellophane" can be closed to render it air-tight and to function as a hanger for the bag or casing and its contents, the device being readily and easily applied and removed with dispatch and will not damage the body of the bag or casing when being applied or removed, thus in the use of such device it eliminates twine or other fastening mediums of a like kind, and is thoroughly sanitary.

A further object of the invention is the provision of a device of this character which is extremely simple in construction, thoroughly reliable and efficient in its purpose, handy for use, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a fragmentary perspective view of a casing having its body made from "Cellophane", showing the mouth folded on itself and the device constructed in accordance with the invention partially engaged thereon.

Figure 2 is a perspective view of a portion of the casing and the device in position for the hanging of such casing and closed thereby.

Figure 3 is an enlarged sectional view on the line 3—3 of Figure 2 looking in the direction of the arrows.

Similar reference characters indicate corresponding parts throughout the several views in the drawing.

Referring to the drawing in detail, A designates generally a portion of a casing or bag for meat, such as sausage or other ground or solid meats, the body being preferably made from "Cellophane" and at its open mouth the body is double folded on itself, as at 5, for the fitting of the device constituting the present invention therewith, this device being hereinafter fully described.

The device comprises a plate 6 preferably made from relatively thin metal folded on itself, at 7, correspondingly to the fold 5 in the bag body A and one end of this plate 6 is laterally flared to provide a free entrance 8 to its fold so that the folds 5 and 7 can be interfitted with each other on the sliding of the plate 6 after introducing the fold 5 of the bag body A into the flared end 8, the plate 6 being substantially the extent of the fold 5 of the bag body A and when engaged by the interfitting of the folds 5 and 7 the said plate 6 is turned over on itself, thus providing a further fold 9 in the bag body A and thus sealing the said bag, as will be apparent, to render it air-tight.

Loosely connected with the plate 6 is a loop handle 10 having the eye terminals 11 engaged through suitable holes 12 in said plate so that the loop handle 10 will be swingingly connected with this plate 6 and will function as a hanger.

In Figure 1 of the drawing the plate 6 is shown partially engaged with the casing body A for the interfitting of the folds 5 and 7 with each other, while Figures 2 and 3 show the final disposition of the device with its handle 10 to serve as a hanger in conjunction with the plate 6.

The flared entrance 8 will avoid any possibility of damage to the body A when the plate 6 is slidably fitted with the folded mouth of said body.

The device can be readily and quickly applied and removed to and from the casing A.

In the use of the device the necessity of twine or other like ties is eliminated.

What is claimed is:

The combination of a bag-like container open at one end, a closure and hanger therefor comprising a plate, said container at its open mouth and said plate being formed with double folds for the removable interfitting with each other, a flared end formed at the folds of said plate to provide a free entrance of the folds of said container on the relative longitudinal shifting of the bag and plate with respect to each other, said plate having a portion extended to be beyond the container, and a handle swingingly connected with said projected portion.

ARTHUR A. SCHAAF.